United States Patent [19]

Gerlach

[11] 4,117,265

[45] Sep. 26, 1978

[54] HYPEROPTIC TRANSLATOR SYSTEM

[75] Inventor: Richard K. Gerlach, Rolling Hills Estates, Calif.

[73] Assignee: Richard J. Rengel, Rolling Hills Estates, Calif.

[21] Appl. No.: 700,545

[22] Filed: Jun. 28, 1976

[51] Int. Cl.² ............................................. G02B 17/00
[52] U.S. Cl. ................................................. 179/1 SP
[58] Field of Search ....................... 179/1 SP; 250/199

[56] References Cited

U.S. PATENT DOCUMENTS

| | | | |
|---|---|---|---|
| 3,463,885 | 8/1969 | Upton | 179/1 SP |
| 3,604,852 | 9/1971 | Weintraub | 179/1 SP |
| 3,936,605 | 2/1976 | Upton | 179/1 SP |

*Primary Examiner*—Thomas W. Brown
*Assistant Examiner*—E. S. Kemeny

*Attorney, Agent, or Firm*—Richard J. Rengel

[57] ABSTRACT

A sound-to-optic translator system for the hard-of-hearing is disclosed. Light-emitting diodes of different colors provide sources of light that are hyperoptically (out-of-focus) located directly in front of the pupil of the eye and along the normal line-of-sight to project overlapping color discs onto the macula area of the retina to be sensed by the cones. The diodes are supported by a T member having a width approximately one-half or less than the diameter of the pupil under normal reading light intensity and positioned at less than distance of focus of the eye. Audio frequencies are separated into a plurality of bands by bandpass filters and outputs of the respective filters drive respective diodes to hyperoptically transmit colors onto the macula.

18 Claims, 11 Drawing Figures

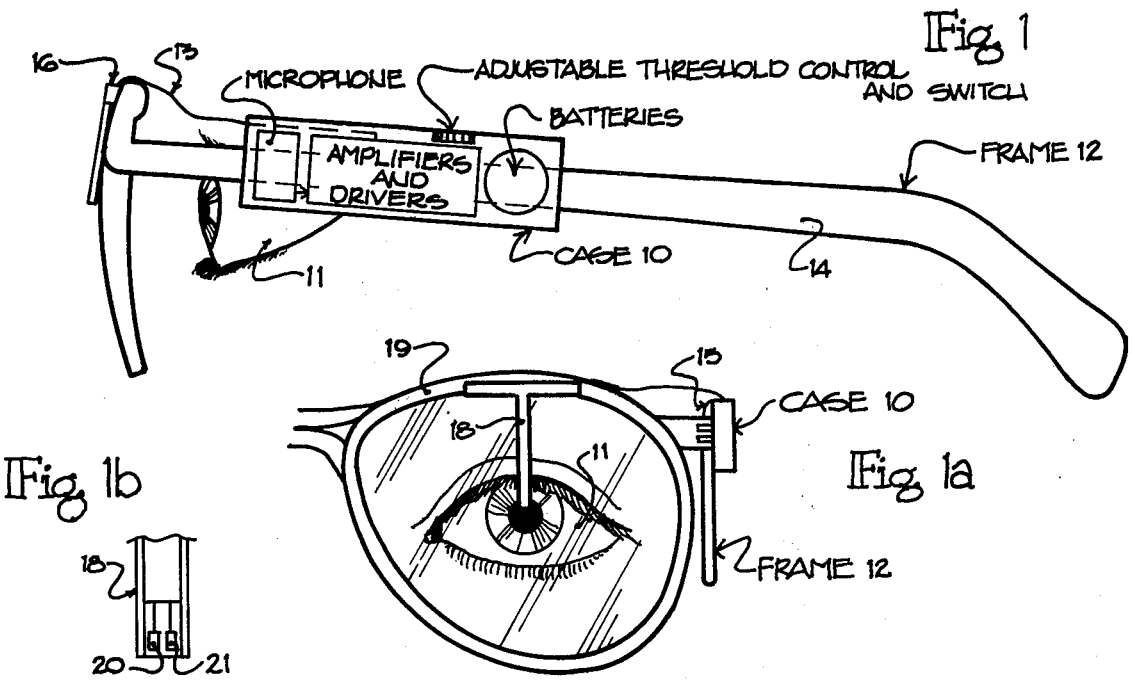
Fig. 1
Fig. 1a
Fig. 1b
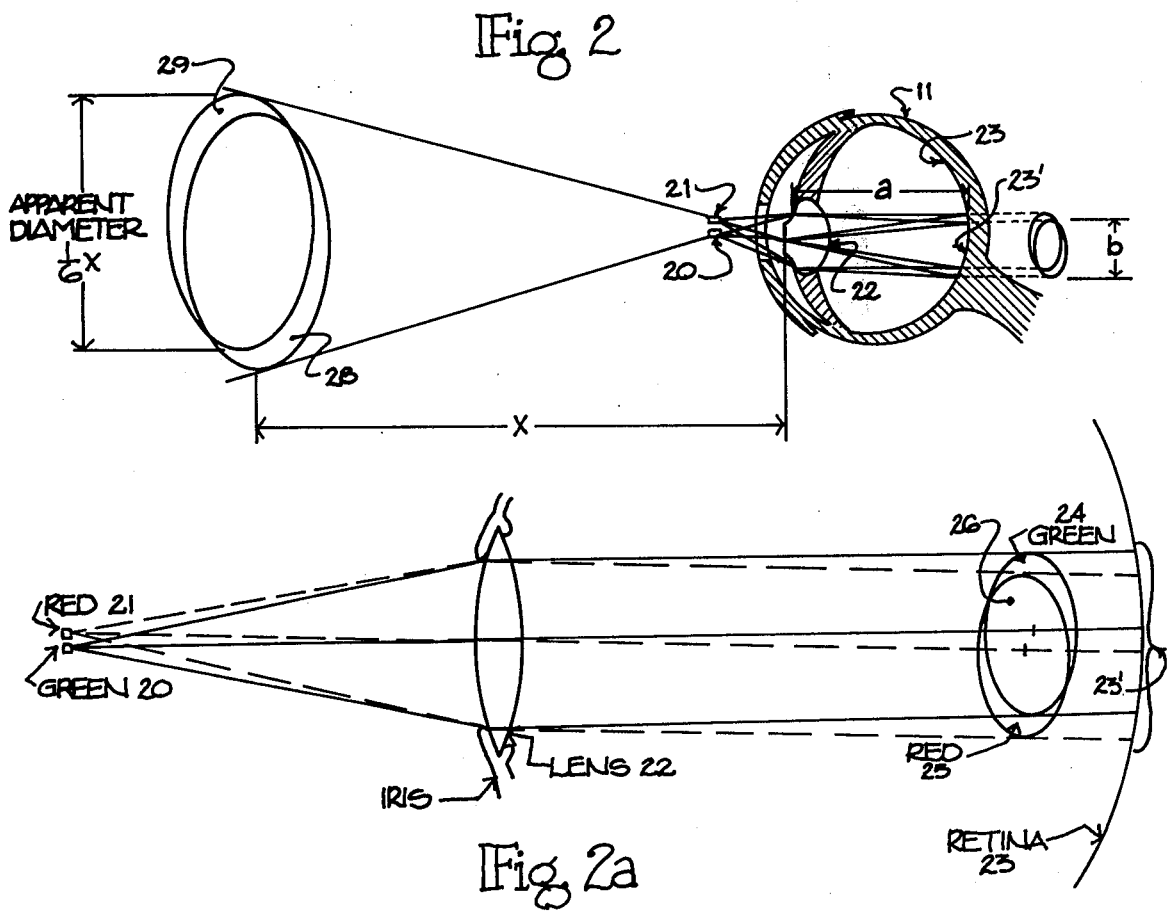
Fig. 2
Fig. 2a

HYPEROPTIC TRANSLATOR SYSTEM

BACKGROUND OF THE INVENTION

In general, color displays which vary in color and intensity according to frequency bands and loudness of sound have been used with music for entertainment. Also, indicators using both color and sound are well known. The color displays and color organs therefor often provide information, but this is incidental since the design is directed to providing a color show rather than conveying information. Color and sound indicators are often found in control panels for indicating the status of respective operating conditions. Neither of the foregoing provide a personal or portable hyperoptical translator for real time communication of information as provided by the present invention.

SUMMARY OF THE INVENTION

In contrast, the hyperoptical translator system of the present invention provides continuous, real time monitoring of the surroundings for sounds that a deaf person, for example, desires to be made aware of immediately as they occur. At the same time, background noise is readily cut out by adjusting the level of cutoff of the drivers for the light sources.

More important, the use and operation of the translator is convenient and does not produce objectionable interference with normal vision. A thin, small case for the electronics including batteries is readily attached to the frame of eyeglasses and color emitting sources, e.g., diodes are placed directly in front of the pupil of the eye for continuous monitoring of the ambient sound that is at the desired level of intensity. Separation of ambient sound frequencies into particular bands provides for interpretation by lighting of different colors and intensities of corresponding color sources.

The structural arrangement of the light sources and support therefor, which locates the source in front of the pupil of the eye is small enough, i.e. the width is one-half or less of the pupil diameter, and close enough to the eye so as not to be readily visible (even though located along the normal line-of-sight), except when the sources are energized to emit light. When light is emitted by any one or more of the sources, transparent overlapping colored discs appear on the surface of planar objects that the eye is focused upon and the size of the discs is approximately one-sixth of the distance to the surface of the object.

BRIEF DESCRIPTION OF THE DRAWINGS

FIG. 1 is a side view which illustrates the preferred embodiment of the invention attached to the frame of the eyeglasses.

FIG. 1a is a front view showing a portion of the frame, the lens and eye to illustrate the positioning of the light sources by the support member.

FIG. 1b is an enlarged detail view of the lower end of the support member for showing the location of the light sources on the side facing the eye.

FIG. 2 and FIG. 2a are schematic diagrams for illustrating the hyperoptic translation of the light from the color sources.

DESCRIPTION OF THE PREFERRED EMBODIMENTS

Figure 3:
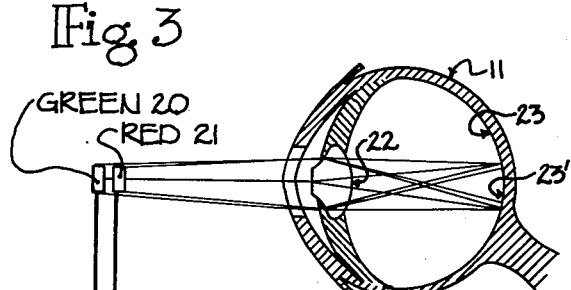
FIG. 3 is a schematic diagram, partly in block form for illustrating the operation of the system of the present invention.

Referring now to the drawings for a detailed description of the preferred embodiments of the invention, FIGS. 1, 1a and 1b illustrate the preferred manner of enclosing and supporting the circuits and components of the preferred visual hyperoptic translator system of the present invention. As shown, the amplifier and driver circuits, threshold control and switch, batteries and microphone are disposed in an elongated case 10 which is removably attached or secured to an eyeglass frame 12. The case 10 is easily attached to a transverse member 14 by a clip 15 or other suitable means e.g. adhesives, which readily retains the case and contents in view of the light weight and small size thereof, e.g. 3 × 0.6 × 0.3 inches.

A T member 18 supports visual communication devices comprising light-emitting solid state devices or semiconductors including, for example, red and green electroluminescent, light-emitting diodes 20, 21. The T member is removably attached to a lateral member 19 of the eyeglass frame 12 and can be adjusted laterally thereon to locate diodes 20, 21. As illustrated in FIGS. 1, 1a and 1b, the T member 18 locates the red and green light-emitting diodes 20, 21 close to the eye 11 of the wearer and directly in front of the pupil, i.e., less than the focal distance of the eye 11 so that the eye will not focus on the diodes 20, 21 or the T member 18. Accordingly, the light projected on the retina of the eye from the diodes will not be focused on the retina but will appear as defined discs, as shown in FIG. 2 and described infra, and although not in focus, clearly defined edges are present and may be examined in the fovea centralis in the center of the macula 23', not only in the edge portions of the discs, but any informational content contained in the discs will be made apparent e.g. color or projected forms or shapes. At this point, it will be noted that the position of T member 18 as shown in FIG. 1a, locates the diodes 20, 21 along the line-of-sight for real time communication of information, i.e., the diodes 20, 21 on the lower end of T member 18 (FIG. 1b) are positioned directly in front of the pupil. Since only the preferred arrangement is illustrated in FIGS. 1, 1a, it should be made clear that beneficial operation of the invention is not limited to precise positioning of the diodes 20, 21 in front of the pupil of the eye 11 as shown in FIG. 1a. For example, the individual user may prefer to locate diodes 20, 21 in the peripheral area of vision, but many of the important advantages of normal line-of-sight alignment of the preferred embodiment will not be present when diodes 20, 21 are aligned to be in the normal line-of-sight for projection onto the macula 23'. Or the user may want to locate the diodes 20, 21 so as to be able to focus his sight on the diodes. However, it is considered to be a more important feature of the invention to locate diodes 20, 21 along the line-of-sight of the wearer in the area of the macula 23', a small area near the center of the retina which provides color vision for the individual, thus maximizing the wearer's sensitivity to color changes in the discs projected on the retina. As shown by the preferred arrangement in FIGS. 1, 1a, the individual can easily look through the eyeglasses and "look through" or beyond the T member and diodes 20, 21 without substantial or noticeable interference with visual acuity because the eye does not focus on either the lower end of the T member 18 or diodes 20, 21 even though they are located along the eye's normal line-of-sight for real time communication. This condition is familiar to most individuals as when a small spot or particle is found on the lens of their eyeglasses, including sunglasses. In most instances, the spot or particle can be ignored and will not be removed until the next convenient cleaning since they are not readily perceptible. This is the case even when the diodes 20, 21 emit light as described infra.

With the foregoing in mind, it remains important that the T member 18 be as narrow as permissible so as not to obstruct normal vision to a significant degree. Accordingly, the width of T member 18 is defined as being one-half or less in width than the diameter of the pupil in average room lighting for reading, for example. This definition determines the width of the T member to be approximately one-tenth of an inch or less. In the preferred embodiment, the width of T member is 0.060 inch. Also, the T member 18 is removably attached to the lateral member 19 by clips or adhesive and therefore laterally adjustable for locating the T member and diodes 20, 21 along the line-of-sight or in the area of peripheral vision, for example, as desired. The T member is preferably formed from plastic and having sufficient shape retention or rigidity to maintain the diodes 20, 21 next to the glass lens of the eyeglasses. Of course, the support for the system of the invention may take other structural forms than the frame 12 of eyeglasses, but some type of frame appears desirable rather than attaching the invention directly onto the user. Also, a hollow T member 18 is considered to be a convenient support for the diodes 20, 21 and also provides a support and enclosure for the wires 13 connecting the amplifier and driver circuits to the diodes 20, 21. The lower end of T member 18 should not extend down into the pupil area and line-of-sight any further than necessary to locate diodes 20, 21 into the line-of-sight, i.e. as shown in FIG. 1a. The reason, of course, is to minimize the area of the diodes and supporting end of T member in front of the pupil while locating the diodes along the line-of-sight for projection of the light from the diodes on the fovea. Accordingly, the lower end of T member 18 does not project down and across the entire pupil area.

Referring to FIGS. 2 and 2a, the optical diagrams illustrate the operation of the hyperoptic translator with regard to the optics thereof. Green and red light emitting diodes 20, 21, as shown in FIG. 1b to be disposed on the lower end of the T member 18, project light through the pupil and lens 22 onto the macula area 23' of the retina 23 to form defocused, overlapping, green and red circular images 24, 25. The area of overlap 26 varies from orange to yellow sequentially in time, with variation in relative intensity of emission of green and red light from diodes 20, 21, respectively. The change in intensity of light emission of the individual diodes 20, 21 is described in detail infra.

Preferably, diodes 20, 21 are very small, approximately 15 × 15 mils, and when positioned side by side and touching one another, with a 15 mil center-to-center separation for example, the centers of the circular images 24, 25 projected on the retina 23, will be spaced as determined by the center-to-center separation multiplied by a factor which is the ratio of the distance $a$ from the lens 22 of eye 11 to the retina 23 divided by the distance from the lens 22 to the diodes 20, 21. For example, when diodes 20, 21 are positioned about $\frac{5}{8}$ inch from the lens 22 and the lens to retina distance is about $\frac{3}{4}$ inch, the 15 mil center-to-center separation of diodes 20, 21 will be multiplied by the factor: $\frac{3}{4}$ divided by $\frac{5}{8}$ = 1.20. Accordingly, the centers of the circular images of light on the retina will be separated by about 18 mils which is the actual separation of the diodes 20, 21 times the factor 1.20.

The eye 11 will perceive the circular images on the macula 23' as circular discs 28, 29 suspended in space and often superimposed upon a planar surface of whatever object the eye 11 is focused upon. For example, when the eye 11 is focused on the surface of a wall located at a distance $x$, 6 feet from the eye, the circular discs 24, 25 on the macula 23' will appear as discs 28, 29 each about 1 foot in diameter. The dimensions of the discs 24, 25 on the macula and discs 28, 29 on the surface of the distant object are dependent upon the size of the pupil which was assumed to be in a room having lighting considered normal for reading and about $\frac{1}{8}$ inch in diameter. In general, the circular discs 24, 25 on the retina 23 each have about the same diameter as the pupil, e.g. $\frac{1}{8}$ inch due to the normal refraction of the eye lens 22, cornea, etc.

The more important feature of the hyperoptical translator of the invention has been disclosed in detail supra wherein at least one small light source is located at a distance in front of the eye 11 which distance is less the focal length of the eye to produce an out-of-focus image which the individual perceives as a very much larger faint image (1/6 $x$) at a substantially greater distance $x$, as described. It is an important feature of the preferred embodiment that the light sources be smaller than the pupil during useful operation in order to maintain the pupil at least twice the diameter of the light source as discussed supra. Accordingly, sunglasses can be important in maintaining the size of pupil to be twice the size of the light sources and support therefor. Since the intensity of the light is dependent upon the size of each of the light-emitting solid state devices, the preferred embodiment discloses diode devices 20, 21 which are used in combination to provide coding by color and as spaced apart, they occupy an area less than the area of the pupil for transmission of emitted light to the retina. At the same time, the width of the combined spaced diodes 20, 21 including the support therefor, does not adversely effect normal vision of the eye 11 to any substantial amount. The importance of location and small size of devices 20, 21 does not limit the invention to light-emitting diodes 20, 21 for other light-emitting devices are small enough to provide small or point sources of light, e.g., gas discharge point sources of light are presently being used in commercially available digital indicators. Also, the alternate preferred embodiments avoid the problem of size of the devices by use of light guides for locating the light in front of the eye or irregularity in the surface of a lens.

Figure 4:
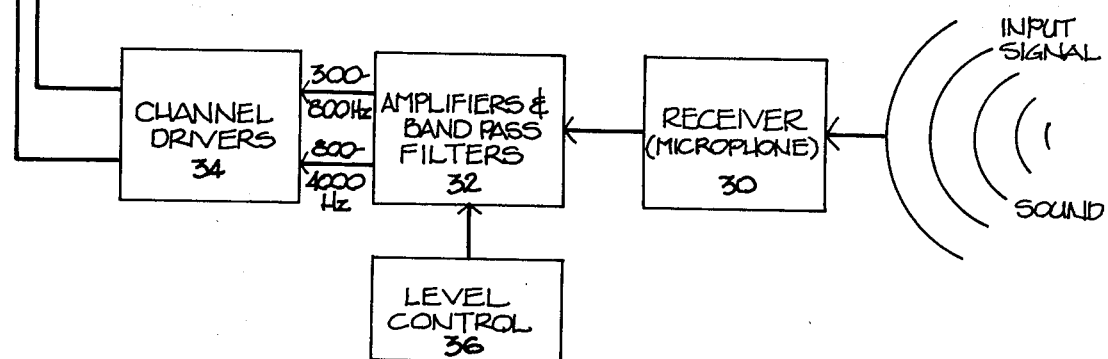
FIG. 4 is a schematic circuit diagram of a typical drive circuit for energizing one of the color sources and providing a threshold level.
Figure 4:
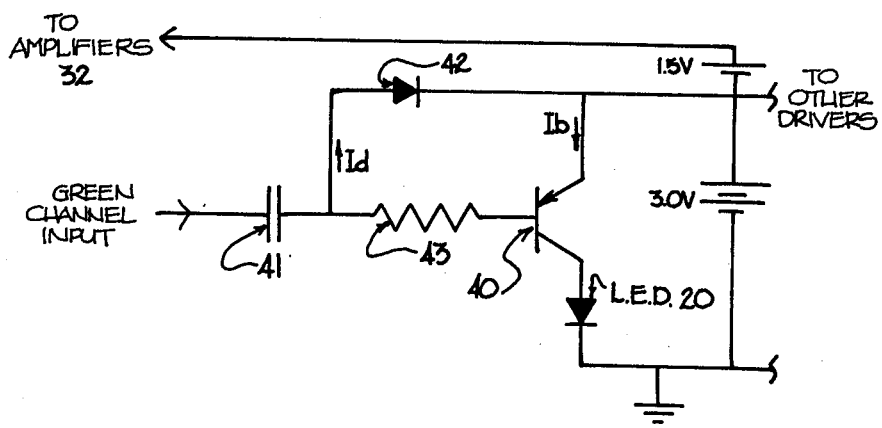

In the schematic block diagram of the preferred embodiment of FIG. 3, sound signals picked up by a RECEIVER 30, e.g., sound signals received by a miniature microphone, are coupled to AMPLIFIERS and BAND PASS FILTERS 32 having a plurality of outputs for respective frequency bands of the bandpass filters. In FIG. 3, only low and high audio frequency bands outputs are illustrated. These outputs are coupled to respective ones of the inputs of CHANNEL DRIVERS 34 including individual driver circuits for respective red and green light-emitting diodes 20, 21. In FIG. 4, a typical driver circuit is shown schematically to illustrate the operation thereof including the provision of a threshold level for eliminating background noise which threshold level also provides a level of cut-off of the driver and current for conserving power supplied by miniature batteries of the mercury, silver or zinc-air type, for example, three standard batteries size #675 which are supplied commercially for hearing aids.

In FIG. 3, AMPLIFIERS AND BANDPASS FILTERS 32 preferably comprise a micro-miniature integrated circuit module including a plurality of chips for first and second stage amplifiers each having a gain of approximately 100; a level control having provision for manual adjustment by the adjustable threshold level control and switch shown in FIG. 1, or automatic gain control; low and high active bandpass filters for frequency bands from 200 to 800 Hz and 800 Hz to 4000 Hz, for example. For speech interpretation or where otherwise found desirable, there is no real limit to the number of bandpass filters or the desired arrangement of pass bands and number of light-emitting diodes (L.E.D.) except as discussed supra. However, it should be noted that the size of the L.E.D. can be reduced to accommodate the combined overall size limitation of the preferred embodiment in which the overall size of a group of L.E.D.'s should provide no noticeable or readily tolerable interference with normal vision.

Figure 3A:
FIG. 3a shows the image of FIG. 3 as optically translated.

FIG. 3a shows the hyperoptic translated image similar to that of FIG. 2a.

Figure 5:
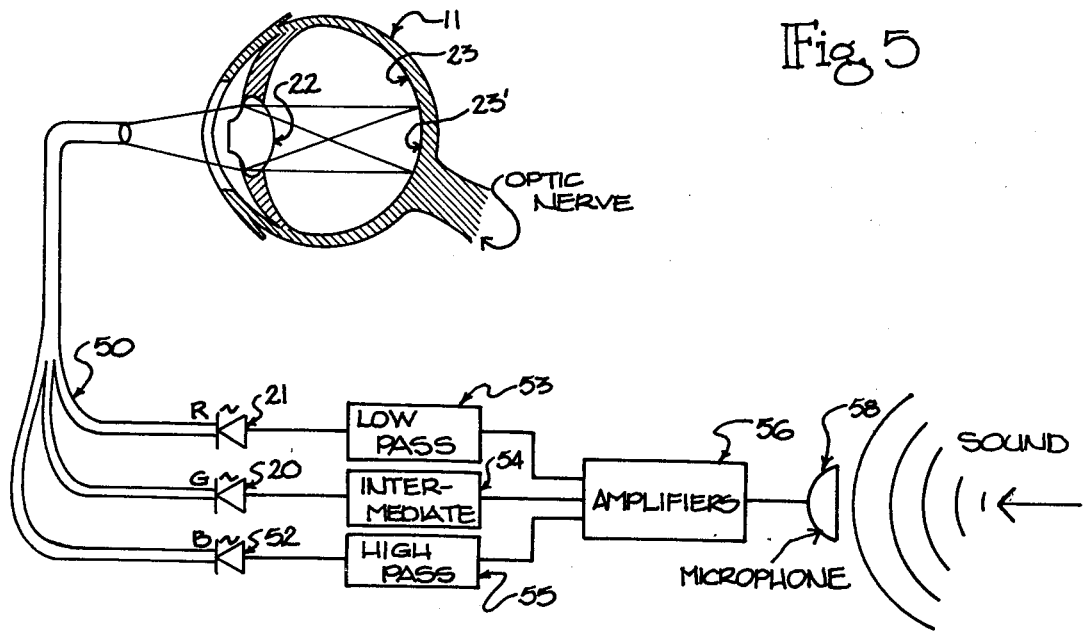
FIG. 5 is a schematic diagram, partly in block form, for illustrating the operation of an alternate preferred embodiment of the hyperoptic translator system of the present invention having three light sources in which light transmission is provided by fiber-optic light guides and other features.
Figure 6:
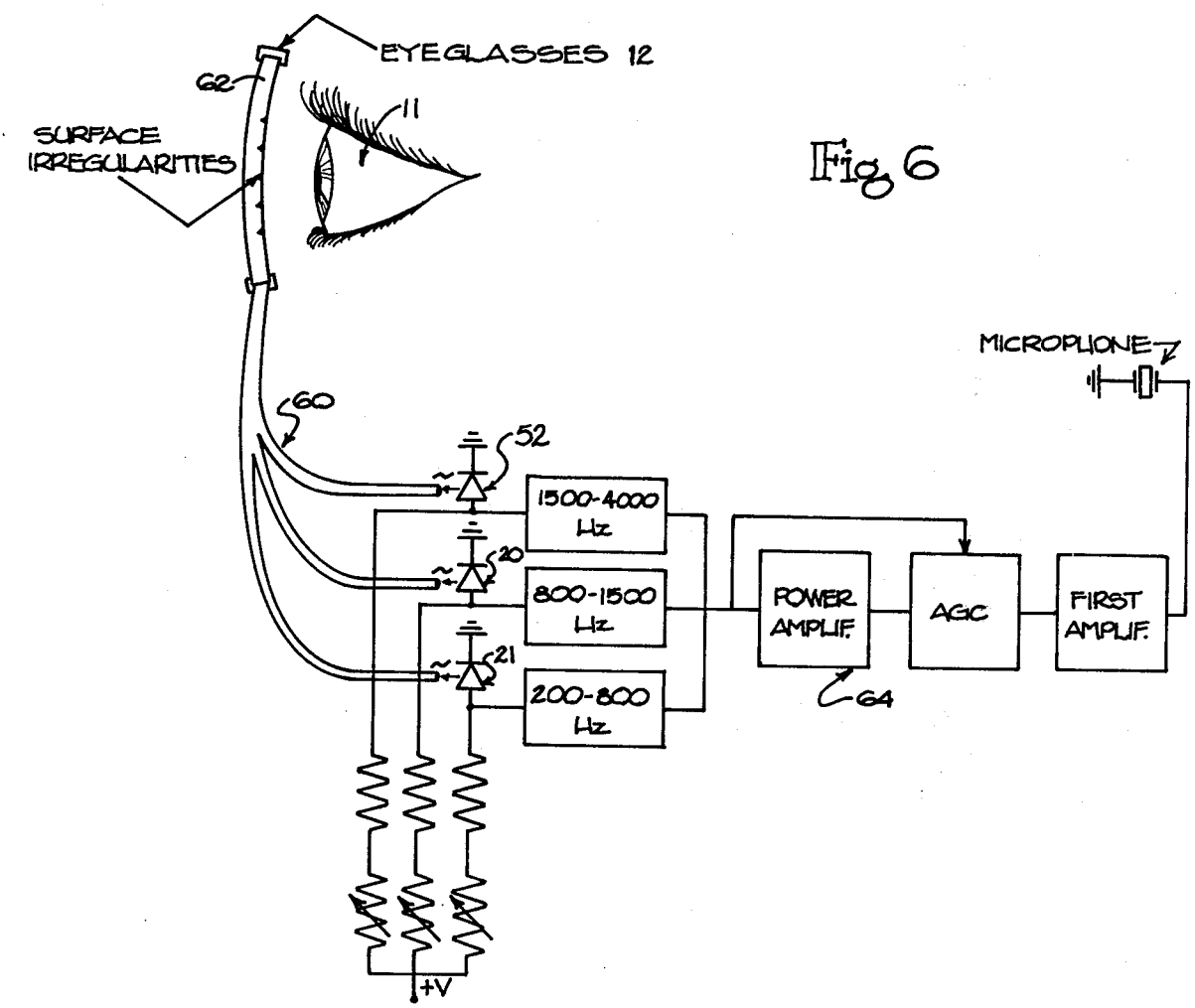
FIG. 6 is a schematic diagram, partly in block diagram, for illustrating the operation of another alternate preferred embodiment of the hyperoptic translator system of the present invention providing side illumination of a lens and other features.

In the preferred embodiment of FIGS. 1-4, color coding for translation is shown to be provided by green and red L.E.D.'s. In FIGS. 5 and 6, an additional blue L.E.D. is provided for indication of each of three pass bands as described and shown in detail infra. It should be evident that the receiver 30 may comprise a receiver for AM, FM, infrared or ultra-sonic signal inputs instead of a microphone for sound signals. The preferred embodiment being intended for the deaf, reception of sound signals is shown. Further, as shown, the selection of frequency bands is based on maximizing potential use, or effectiveness of use in speech interpretation and clearly provides for the primary function to alert the user to presence of sound by light activity generated by his own voice or the voice of others. This is particularly important when another speaks who is not seen by the user because the user is not facing the speaker or vice versa. In addition, the user can distinguish between various high and low frequency warning sounds, e.g. sirens, horns, or other common signals as door bells or chimes, telephone or the buzzer of a timer or the like as used for cooking and other timed operations.

In speech interpretation, the spectrum of human voice locates vowel sounds generally below 1000 Hz and consonants generally above 1000 Hz. Further examination of the power spectrum of the human voice reveals one power peak around 350 Hz with lesser power peaks occurring about third and fifth harmonics (1050 Hz and 1750 Hz) which peaks are important to the information content of speech as the human voice shifts the peaks in frequency to create words or intelligible sounds.

In view of the foregoing, a system of the invention having only two pass bands for low and high audio frequencies as shown, provides for driving a plurality of light sources wherein one band includes the lower frequency peak and vowel sounds below 1000 Hz and the other band includes the power peaks above 1000 Hz of the harmonics and responds to consonant sounds. Typical filter characteristics for the two bands provide for crossover at 0 db at 300 Hz, 800 Hz and 4000 Hz with power peaks at +15 db at 350 Hz and 1100 Hz for respective low and high filters.

In FIG. 4, the schematic circuit diagram shows a typical one of the CHANNEL DRIVERS 34 in order to provide a detailed description of the circuit operation which provides the desired threshold level for not only the elimination of background noise but equally important to provide for minimizing current drain and power dissipation since the life of the miniature batteries is one of the most important considerations in the design of a practical system of the present invention. These batteries have limited power. Low current drain provided by the system of the present invention extends battery life by a substantial amount, e.g. a total life of more than 100 hours may be expected for three batteries in normal use.

Figure 4A:
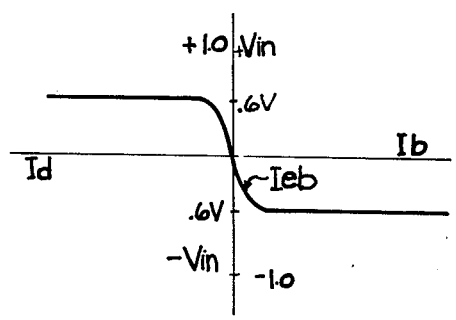
FIG. 4a is a characteristic curve for the PNP transistor of the driver circuit shown in FIG. 4.

As shown in FIG. 4, a non-linear driver transistor 40 is coupled to the green channel input by ac coupling capacitor 41 which is connected to the emitter by diode 42 and to the base by series resistor 43. The impedance of capacitor 41 is small at the frequency of input signal as compared to the resistance of resistor 43 connected in series to the base of transistor 40. The diode 42 and transistor 40 remain non-conducting until an input signal of about 0.6 volts, for example, is applied in the forward direction whereupon a small increase in bias will produce a large emitter-base current flow $I_{eb}$, as illustrated by the non-linearity of characteristic curve in FIG. 4a. This non-linearity produces the threshold level at 0.6 volts, for example, as desired. Since the bias current is multiplied by the beta of the transistor 40, e.g. PNP transistor #3906, a large collector drive current is produced to operate the L.E.D. 20. The diode 42 is provided to balance the impedance on the capacitor thus not charging the capacitor which would create a D.C. bias that would cut off the current flow in the base of the transistor on subsequent signal swings.

The microphone 30 is a miniature device that has an output response characteristic which is intended to match or compensate for the decrease in power of the human voice over the range of voice frequencies thereby equalizing the microphone output over the frequency range of microphone operation, e.g. 100 Hz to 4000 Hz. That is, the typical decrease in decibels at higher frequencies of the human voice is about 12 db per octave whereas the increase in response of the microphone output at higher frequencies and uniform sound pressure, is about 12 db per octave. In operation therefore, the drive current for the diodes 20, 21 will not vary substantially with frequency but will vary linearly with sound level. The important result is that low frequencies will drive the red L.E.D. or other light-emitting device, with the same intensity as the high frequencies drive the green L.E.D. when the sounds consist of the voice of a human. This is important in certain speech pattern relations for recognition by a deaf person. Ultimately, the effectiveness of the visual communication of speech information provided by the system of the present invention, in the form of speech to light transitions, depends upon the ability and determination of the individual to utilize the information provided.

Referring to FIGS. 5 and 6, alternate preferred embodiments are shown by schematic block diagrams in which fiber-optics provide light guides 50, 60 for transmission of red, green and blue light emitted by respective light sources such as solid state devices or L.E.D.'s.

In FIG. 5, red, green and blue light emitted by diodes 21, 20, 52 are transmitted by the light guide 50 and combined at the upper end thereof which is positioned in front of the pupil of eye 11 by suitable support means such as the eyeglass frame 12 as shown in FIGS. 1, 1a for example. The end of the light guide is located in front of the eye 11 to project the light through the pupil and preferably onto the area of the macula 23' to be sensed by the cones for the reasons discussed supra. As shown, any of the primary colors emitted by the diodes are combined to produce all of the colors of the light spectrum to be sensed by the cones. For example, a combination of outputs of low and high frequency bands, from low pass and high pass band filters 53 and 55, will provide drive currents to red and blue diodes 21 and 52.

The drive currents cause the diodes 21, 52 to emit red and blue light which is transmitted by respective individual sections of the light guide 50 that merge into a single light guide having its upper end located in front of the pupil to project the combined red and blue (purple) light into the eye and onto the macula 23' to be detected by cones located in the central area of the retina including behind the fovea. Outputs from amplifiers 56 in the low, intermediate and high frequency bands will activate respective red, green and blue diodes 21, 20, 52 to produce respective colors in the individual sections of light guide 50. The sound detected by microphone 58 is amplified and separated into frequency bands for producing corresponding ones of the primary colors red, green and blue. As in the preferred embodiment of FIGS. 1–4 the upper end of the light guide 50 is at a distance from the eye which is less than the minimum distance for focus of the eye 11 and directly in front of the pupil when the eye is centered as shown in FIG. 1a.

An alternate arrangement of the light guide 50 of FIG. 5 does not combine the individual ends thereof but provides individual light guides for each of the red, green and blue colors for individual transmission and projection into the pupil where the colors combine in an overlapping area of three circular discs projected on the macula 23' which is described supra in FIGS. 2, 2a (for only green and red colors emitted directly from diodes 20, 21). The upper ends of the individual light guides are placed adjacent each of the others in a tight triangular pattern about the normal line-of-sight, for example, or in vertical or lateral alignment as desired.

One of the important advantages of the light guides is that fiber optics are very small, e.g., about 1 to 15 mils (0.001 to 0.005 inch) and are transparent and therefore practically invisible except for colored light emitted and projected therefrom into the eye 11. Thus, real time transmission of signals is provided by alignment of the ends of the light guide 50 along the line-of-sight to the macula 23' with practically no interference with normal vision and only slight interference during colored light transmission. It should be noted that where individual light guides extend in front of the eye and project respective primary colors onto the macula, the overlapping area combines the colors while individual colors will be produced in the non-overlapping areas of the three respective circular discs corresponding to respective light guides.

In FIG. 6, the upper end of light guide 60 engages the edge of the glass or lens 62 of eyeglasses 12 which lens has surface irregularities at least in the area along the normal line-of-sight of eye 11 to project light through the pupil and onto the macula 23' to activate cones in the central area of the retina 23 as shown in FIG. 2a. The remainder of the operation of the system of the invention shown in FIG. 6 is substantially the same as the operation of corresponding circuits and light transmission described in connection with FIG. 5. In addition, the system of FIG. 6 provides an automatic gain control AGC for power amplifiers 64 which is adjusted to eliminate background noise or to any level desired by the user. The bandpass of each color channel is shown which corresponds to power peaks in respective frequency bands of the human voice including 350 Hz, 1050 Hz and 1750 Hz and frequency shifts thereof which is important for information content.

While preferred embodiments of the invention have been disclosed, it should be clear that the present invention is not limited thereto, as many variations and additional embodiments will be apparent to those skilled in the art. For example, there are many variations of the hyperoptic translator system that become apparent in which a small or point source of light is located in front of the pupil of the eye and along the normal line-of-sight thereof and at a distance less than the minimum focal distance of the eye lens so that the color and other information contained in the area of the source and projected onto the macula area of the retina will be readily discerned by the cones during light emission while producing negligble or no practical interferences with normal vision.

What is claimed is:

1. A hyperoptic translator adapted to be supported alongside eyeglasses and the like, said translator comprising:
    a small source of light;
    means for receiving signals and modulating light from said source; and
    means for supporting the source of light, said support means including an individual member for locating the source of light alongside an eyeglass lens and in front of the pupil of the eye and at a distance less than the focal distance of the eye to project out-of-focus on the macula area of the retina of the eye, the width of said member and source mounted thereon being approximately less than the radius of the pupil of the eye in ambient light.

2. The hyperoptic translator according to claim 1 in which said support means comprises an eyeglass frame and the width of said menber and source is determined by lack of perceptibility of the structure including the member and source when located in front of the eye in desired ambient light intensities.

3. The hyperoptic translator according to claim 1 in which the length of said member is determined by locating the source of light at approximately the center of the pupil of the eye.

4. The hyperoptic translator according to claim 1 in which said light source includes a plurality of closely spaced devices for emitting different colored light from about a point.

5. The hyperoptic translator according to claim 1 in which said light source comprises the end of a light guide.

6. The hyperoptic translator according to claim 1 in which said light source includes a plurality of closely spaced devices capable of emitting different colors from about a point and further includes circuit means for individually energizing said devices.

7. The hyperoptic translator according to claim 6 in which said circuit means includes driver circuits for individually energizing said devices and said driver circuits include threshold circuit means for controlling the intensity level for energizing said devices.

8. A hyperoptic color translator adapted to be supported alongside eyeglasses and the like comprising:
a plurality of sources of light of different colors;
means for electronically producing a plurality of energizing signals selectively in response to radiant energy including a plurality of different frequency bands;
means for coupling said energizing signals to said sources of light for selectively energizing the sources to selectively produce light of different colors; and
means for supporting said sources alongside the eyeglasses and in front of the pupil of the eye to be positioned along the line-of-sight thereof and the electronic means to project the light produced on the macula for hyperoptic translation.

9. The hyperoptic translator according to claim 8 in which said sources of light of different colors comprise point sources of light and the support means locates the sources at a distance less than the focal length of the eye.

10. The hyperoptic translator according to claim 8 in which the light from each of said sources are closely adjacent to one another so as to produce superpositioning of the light of different colors from said sources.

11. The hyperoptic translator according to claim 8 in which the support means includes means for enclosing electronic means, and supporting the electronic means and sources of colored light about the head of a user for hyperoptical translation of ambient sonic radiant energy.

12. The hyperoptic translator according to claim 8 in which said means for electronically producing energizing signals includes threshold means for regulating the level of response to radiant energy for energizing the respective sources of light.

13. The hyperoptic translator according to claim 8 in which said sources of light of different colors are energized singly and in combination to produce a sequence of colors hyperoptically which are a function of the sequences of frequency bands in the radiant energy.

14. The hyperoptic translator according to claim 8 in which said sources comprise a plurality of electroluminescent devices of different color emission characteristics.

15. The hyperoptic translator according to claim 8 in which said sources of colored light comprise sources of red and green colors.

16. The hyperoptic translator according to claim 8 in which said sources of light comprise sources of red, green and blue colors.

17. The hyperoptic translator according to claim 8 in which the relative intensity of light of respective colors is a function of the relative intensity of the radiant energy for producing energization of the sources.

18. The hyperoptic translator according to claim 17 in which the electronic means includes driver circuit means for producing signal currents for energizing said driver circuit means for regulating the level of response to radiant energy.

* * * * *